(12) United States Patent
Otsuki (10) Patent No.: US 11,634,058 B2
(45) Date of Patent: *Apr. 25, 2023

(54) TABLE FOR SEAT (71) Applicant: Honda Motor Co., Ltd., Tokyo (JP)

(72) Inventor: Jun Otsuki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/458,150

(22) Filed: Aug. 26, 2021

(65) Prior Publication Data

US 2022/0105849 A1 Apr. 7, 2022

(30) Foreign Application Priority Data

Oct. 7, 2020 (JP) .............................. JP2020-169563

(51) Int. Cl.
*B60N 3/00* (2006.01)
(52) U.S. Cl.
CPC .................................... *B60N 3/002* (2013.01)
(58) Field of Classification Search
CPC ........ B60N 3/001; B60N 3/002; A47B 31/06; A47C 7/70
USPC .................................. 108/44; 297/145, 147
See application file for complete search history.

(56) References Cited

U.S. PATENT DOCUMENTS

| | | | | |
|---|---|---|---|---|
| 2,582,703 A * | 1/1952 | Kirshbaum | ............ | A47C 13/00 312/266 |
| 3,583,760 A * | 6/1971 | McGregor | ......... | B64D 11/0627 297/145 |
| 4,848,244 A * | 7/1989 | Bennett | ................... | B60N 3/002 16/370 |
| 5,547,248 A * | 8/1996 | Marechal | ................. | B60N 2/79 297/188.17 |
| 6,012,693 A * | 1/2000 | Voeller | ................. | F16M 11/048 248/920 |
| 7,121,514 B2 * | 10/2006 | Twyford | ............. | B60R 11/0264 248/283.1 |
| 8,359,982 B2 * | 1/2013 | Lebel | ....................... | A47B 3/00 108/7 |
| 9,010,852 B1 * | 4/2015 | Conrad | ..................... | B60R 7/00 297/135 |
| 9,027,486 B1 * | 5/2015 | Berkovitz | .............. | B60N 2/793 248/458 |
| 11,131,423 B2 * | 9/2021 | Anderson | .............. | F16M 11/24 |
| 2010/0243839 A1 * | 9/2010 | Westerink | .......... | B64D 11/0638 248/276.1 |
| 2011/0148156 A1 * | 6/2011 | Westerink | ............. | B64D 11/06 108/134 |
| 2012/0312198 A1 * | 12/2012 | Henderson | ............. | B60N 3/002 108/44 |

(Continued)

FOREIGN PATENT DOCUMENTS

JP H10272972 A 10/1998

*Primary Examiner* — Jose V Chen
(74) *Attorney, Agent, or Firm* — Duft & Bornsen, PC (57) ABSTRACT

A table for seat provided facing a seat installed above a floor of a vehicle, including a top plate, and a leg part attached to a support portion provided below the seat to movably support the top plate from an accommodation position below the sitting portion to a use position above a sitting portion of the seat. The leg part includes a movable portion, and a fixing device configured to fix a movement of the movable portion in conjunction with an operation of the top plate.

8 Claims, 11 Drawing Sheets

(56) References Cited

U.S. PATENT DOCUMENTS

| | | | |
|---|---|---|---|
| 2013/0076082 A1* | 3/2013 | Herault | B64D 11/0638 |
| | | | 297/173 |
| 2013/0284074 A1* | 10/2013 | Satterfield | A47B 13/081 |
| | | | 108/63 |
| 2014/0300148 A1* | 10/2014 | Frost | B64D 11/0638 |
| | | | 297/173 |
| 2016/0375810 A1* | 12/2016 | Kong | B60N 3/002 |
| | | | 297/145 |
| 2018/0251057 A1* | 9/2018 | Bywaters | B60N 2/793 |
| 2018/0339775 A1* | 11/2018 | Reyes | B64D 11/00153 |
| 2019/0366900 A1* | 12/2019 | Line | B60R 7/04 |
| 2020/0023761 A1* | 1/2020 | Nishimura | A47B 9/00 |
| 2021/0146816 A1* | 5/2021 | Schanz | A47B 5/06 |
| 2022/0105848 A1* | 4/2022 | Otsuki | B60N 3/002 |

* cited by examiner

TABLE FOR SEAT

CROSS-REFERENCE TO RELATED APPLICATION

This application is based upon and claims the benefit of priority from Japanese Patent Application No. 2020-169563 filed on Oct. 7, 2020, the content of which is incorporated herein by reference.

BACKGROUND OF THE INVENTION

Field of the Invention

This invention relates to a table for seat provided at a seat of a vehicle, etc.

Description of the Related Art

Conventionally, there has been a known apparatus in which a flat table body is accommodated in an armrest provided on a side of a seat on which an occupant sits. Such an apparatus is described, for example, in Japanese Unexamined Patent Publication No. 10-272972 (JPH10-272972A). In the apparatus described in JPH10-272972A, the table body is supported so as to be housed in the armrest and to be withdrawable from the armrest via a support rod movably supported along a guide formed in the armrest and a bracket fixed to the support rod.

However, in the apparatus described in JPH10-272972A, since the table body is accommodated in the armrest, the armrest tends to increase in the width direction, and a space limitation for an installation of the seat is large.

SUMMARY OF THE INVENTION

An aspect of the present invention is a table for seat provided facing a seat installed above a floor of a vehicle. The seat includes a sitting portion. The table for seat includes a top plate, and a leg part attached to a support portion provided below the seat to movably support the top plate from an accommodation position below the sitting portion to a use position above the sitting portion. The leg part includes a movable portion, and a fixing device configured to fix a movement of the movable portion in conjunction with an operation of the top plate.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1A to 6B. A table for seat according to an embodiment of the present invention is applied to a variety of seats located above a floor of a vehicle, etc. Hereinafter, an example of applying the table for seat to a vehicle seat will be described.

Figure 1A:
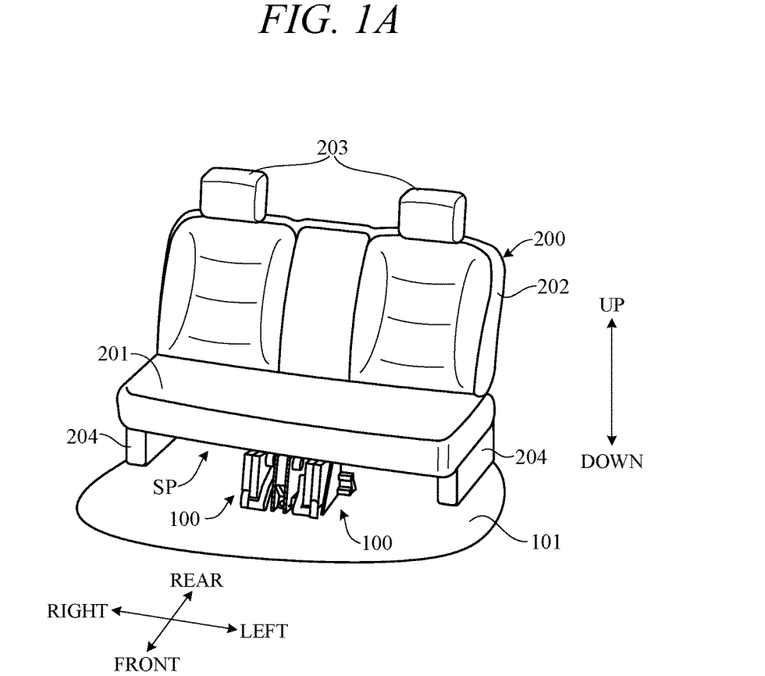
FIG. 1A is a perspective view showing an example in which a table for seat according to an embodiment of the invention is applied to a vehicle and showing a non-use state of the table for seat.
Figure 1B:
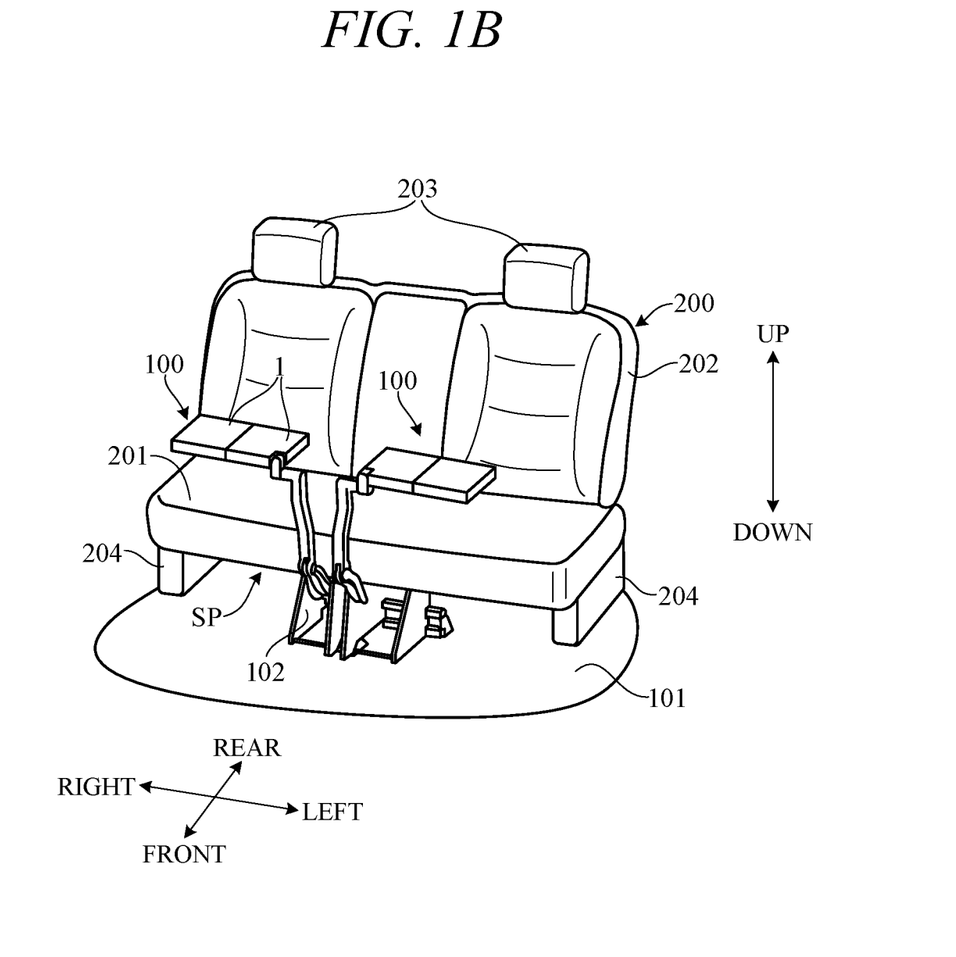
FIG. 1B is a perspective view showing an example in which a table for seat according to an embodiment of the invention is applied to a vehicle and showing a use state of the table for seat.

FIG. 1A and FIG. 1B are perspective views showing an example in which the table for seat 100 according to the embodiment of the present invention is applied to the vehicle. In particular, FIGS. 1A and 1B show an example in which the table for seat 100 is provided in the left and right rear seats of the vehicle. FIG. 1A shows a non-use state of the table for seat 100 in which the table for seat 100 is accommodated in an accommodation position, while FIG. 1B shows a use state of the table for seat 100 in which the table for seat 100 is arranged in a use position. Hereinafter, as shown in the drawing, front-rear direction, left-right direction, and up-down direction are defined, and the configuration of each part will be described in accordance with this definition. The front-rear direction, the left-right direction and the up-down direction are length direction, width direction and height direction of the vehicle, respectively.

As shown in FIG. 1A and FIG. 1B, a seat 200 is installed on a floor 101 of the vehicle. The seat 200 includes a seat cushion 201 for supporting a hip of an occupant, a seat back 202 for supporting a back of the occupant, and a headrest 203 for supporting a head of the occupant. Although not shown, an arm rest for supporting an arm of the occupant put is provided on the left and right sides of the seat 200. The seat 200 (seat cushion 201) is supported from the floor 101 via a pair of left and right legs 204 erected on the upper surface of the floor 101. Although the left and right seats 200 are integrally provided in the drawing, the left and right seats 200 may be provided separately from each other.

An accommodation space SP is formed between the floor 101 and the seat cushion 201 and between the left and right legs 204. A front of the accommodation space SP is opened. As shown in FIG. 1A, a pair of left and right tables for seat 100 in the non-use state are accommodated at the center portion of the accommodation space SP in the left-right direction. As shown in FIG. 1B, the left and right tables for seat 100 are configured symmetrically to each other corresponding to the left and right seats 200 so that the left and right occupants can be used respectively. Hereinafter, the configuration of the table for seat 100 on the right side will be mainly described.

Figure 2:
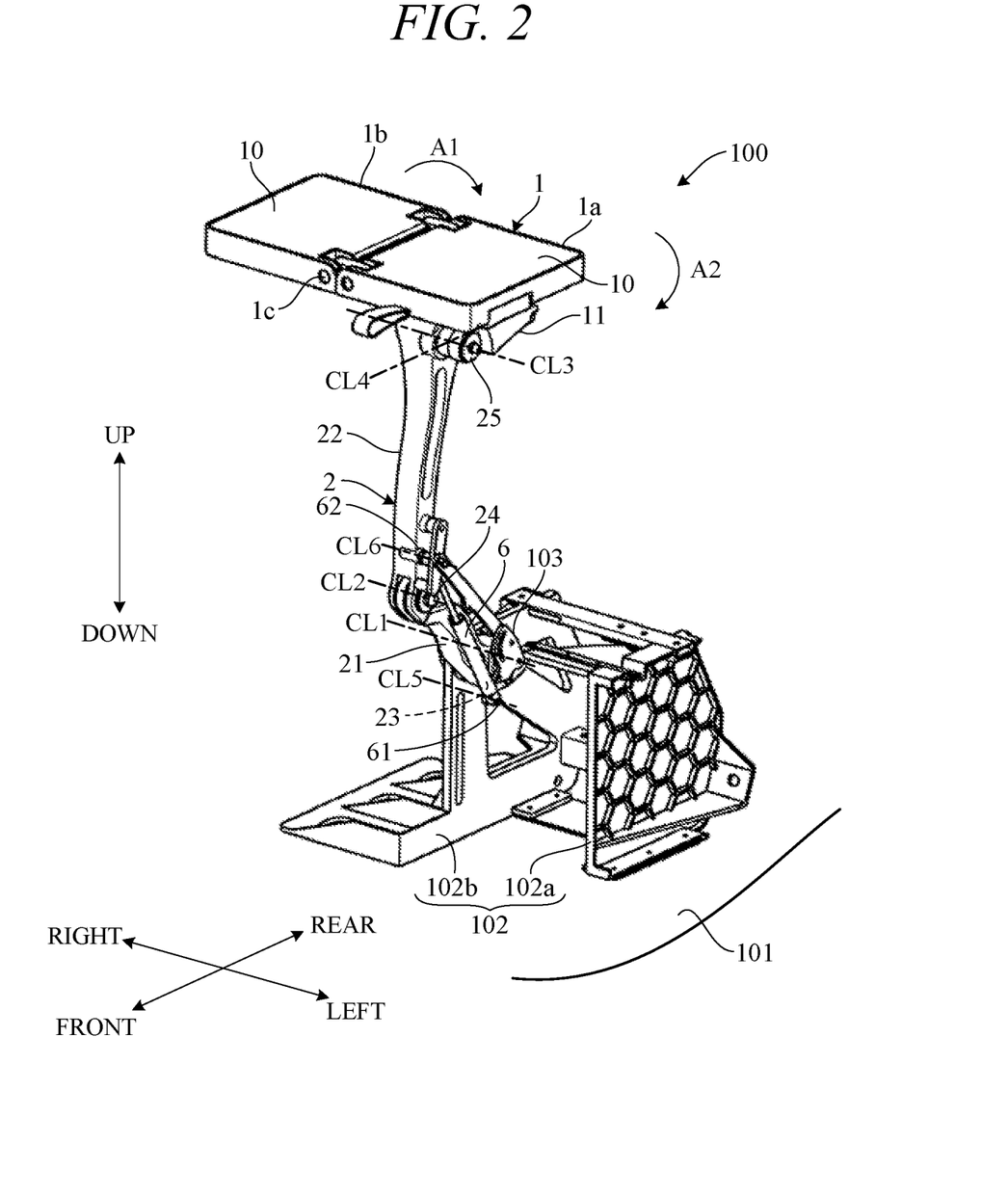
FIG. 2 is a perspective view showing an entire configuration of the table for seat according to the embodiment of the invention.

FIG. 2 is a perspective view showing a whole configuration of the table for seat 100. In particular, FIG. 2 shows a use state of the table for seat 100. As shown in FIG. 2, the table for seat 100 includes a substantially rectangular top plate 1, and a leg member 2 for movably supporting the top plate 1 from the accommodation position (FIG. 1A) below the seat cushion 201 to the use position (FIG. 1B) above the seat cushion 201. A bracket 102 is fixed to an upper surface of the floor 101 below the seat cushion 201 (FIG. 1A). The bracket 102 includes a pair of left and right plate portions 102a and 102b erected on the upper surface of the floor 101. The top plate 1 is accommodated between the plate portions 102a and 102b at the accommodation position.

The leg member 2 has a first leg member 21 and a second leg member 22 which are formed in an elongated shape. The first leg member 21 and the second leg member 22 are each formed of a plate member so as to provide a cavity therein, but may be formed by casting, cutting, or the like. The base end portion of the first leg member 21 is rotatably supported at the support portion 103 provided in the bracket 102 (plate portion 102b), via a shaft portion 23 (see FIG. 3B) extending along an axial line CL1 in the left-right direction. An end of the second leg member 22 is rotatably supported at the distal end portion of the first leg member 21, via a shaft portion 24 extending along an axial line CL2 in the left-right direction. The end portion of the top plate 1 is rotatably supported at another end of the second leg member 22, via a shaft portion 25 extending along an axial line CL3 in the left-right direction.

The top plate 1 includes a pair of left and right plate portions 1a and 1b of substantially rectangular shape rotatable in the left-right direction via the hinge portion 1c. The plate portions 1a and 1b is deployed to the left and right so that mounting surfaces 10 formed by upper surfaces of the table for seat 100 is coplanar, in a use state of the table for seat 100, while the mounting surface 10 of the right side is superimposed on the mounting surface 10 of the left side in a non-use state of the table for seat 100. A support portion 11 is provided at the left end portion of the top plate 1 so as to rotatably support the plate portion 1a about an axial line CL4 in the front-rear direction. The plate portion 1b is rotated to the left (arrow A1 direction) through the hinge portion 1c from the state of FIG. 2, further the plate portions 1a and 1b are rotated to the left (arrow A2 direction) through the support portion 11, thus a posture of the top plate 1 (plate portions 1a and 1b) can be changed from a horizontal posture to a vertical posture. Although not shown, a stopper for limiting the rotation angle so that the top plate 1 is a horizontal posture and a vertical posture, is provided at the hinge portion 1c and the support portion 11.

Figure 3A:
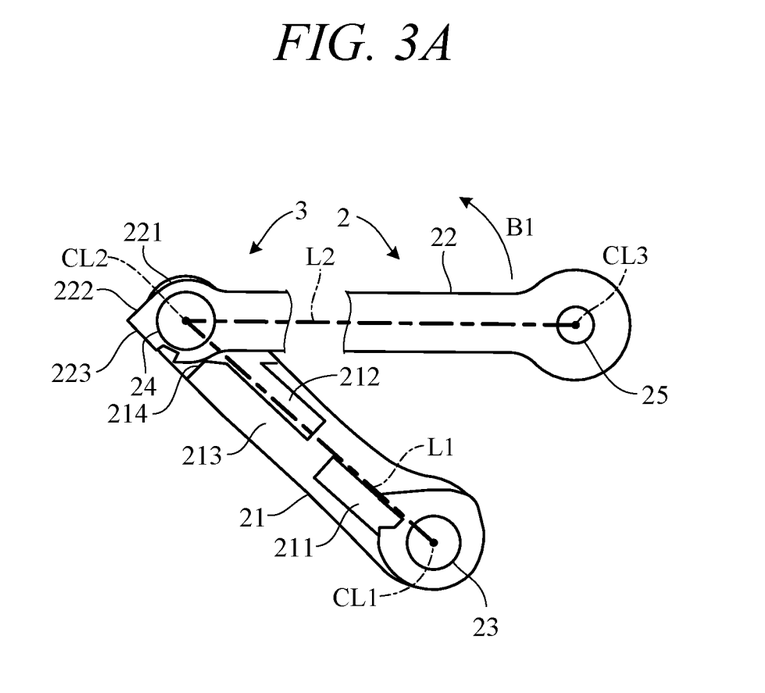
FIG. 3A is a side view showing an internal configuration of a leg member constituting the table for seat according to the embodiment of the invention.
Figure 3B:
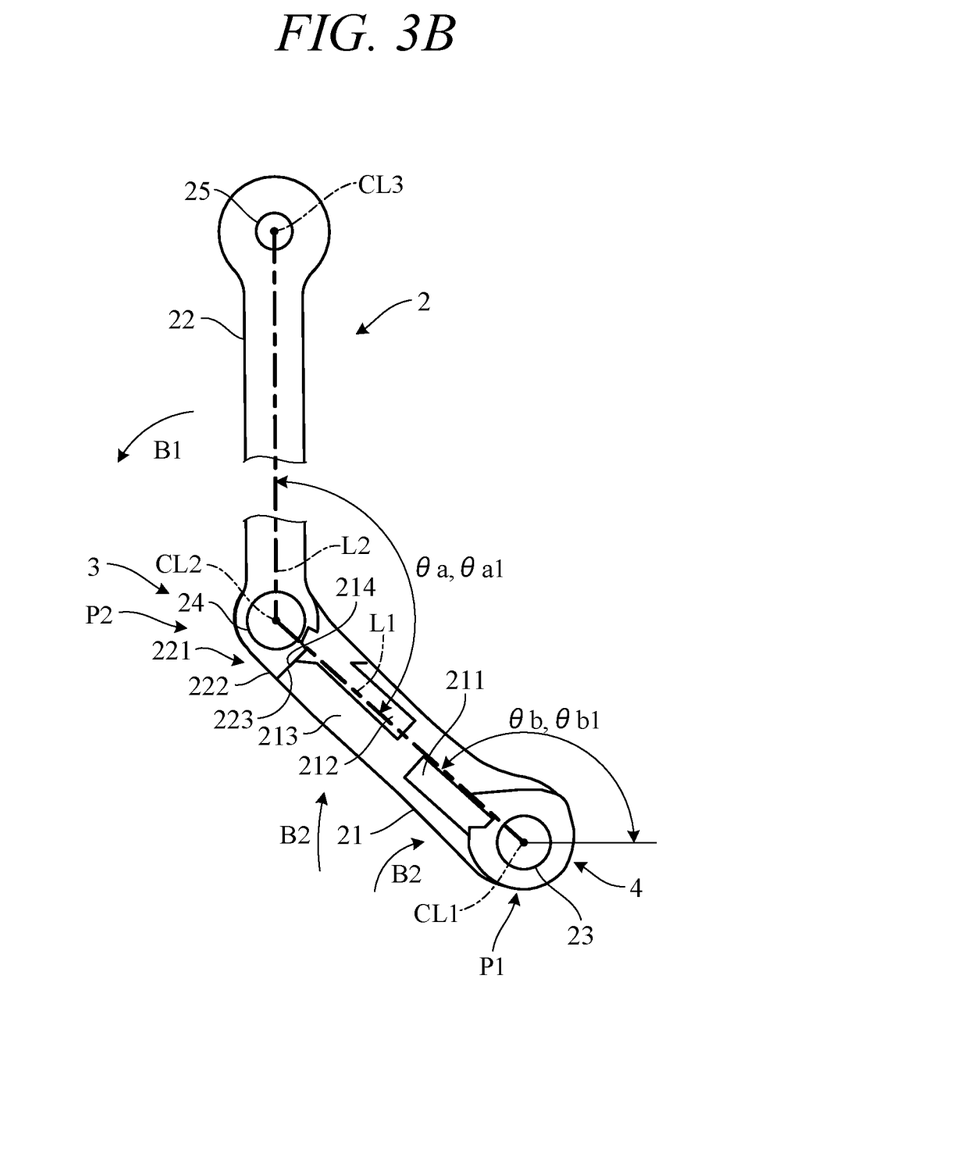
FIG. 3B is a side view showing a posture of the leg member different from a posture in FIG. 3A.

In FIG. 2, the rotation angle of the second leg member 22 with respect to the first leg member 21 is maximum. In this maximum rotation state, the first leg member 21 is inclined forward and upward, and the second leg member 22 is erected upward. The rotation angle of the second leg member 22 with respect to the first leg member 21 is limited by a stopper provided in the vicinity of the shaft portion 24. FIG. 3A and FIG. 3B are side views showing an inner configuration of the leg member 2 (side views as viewed from the left). As shown in FIG. 3A and FIG. 3B, the first leg member 21 and the second leg member 22 extend along a reference line L1 connecting the axial line CL1 and the axial line CL2 and a reference line L2 connecting the axial line CL2 and the axial line CL3, respectively. As shown in FIG. 3A and FIG. 3B, the stopper 3 is provided inside the leg member 2.

More specifically, the surface (left side surface) of the first leg member 21 is formed in a concave-convex shape. That is, a pair of recesses 211 and 212 are formed along the reference line L1, and portions other than the recess 211 and 212 become the convex portion 213. The recess 211 and 212 are formed at the base end side and the distal end side of the first leg member 21 so as to extend substantially parallel to the reference line L1 and so that the recess 211 is positioned on the front side of the first leg member 21 relative to the recess 212 (arrow B1 direction side in FIG. 3B). The second leg member 22 is rotatably mounted so that its surface (right side surface) is positioned on the same plane as the bottom surface of the recess 212. The shaft portion 24 is provided so as to rotate integrally with the first leg member 21. The second leg member 22 has a bearing portion 221 which rotates relative to the shaft portion 24 around the shaft portion 24. A right angle portion 222 is formed on the outer peripheral surface of the bearing portion 221, substantially at a right angle in the side view so as to protrude radially outward.

As shown in FIG. 3A, before the leg member 2 reaches the maximum rotating state, the end face 223 of the right angle portion 222 of the second leg member 22 is spaced from the end face 214 of the convex portion 213 of the first leg member 21 and the second leg member 22 is relatively rotatable with respect to the first leg member 21 about the axial line CL2. When the second leg member 22 is rotated in the direction of arrow B1 from this state and is in the maximum rotating state, as shown in FIG. 3B, the end face 223 of the right angle portion 222 abuts against the end face 214 of the convex portion 213. Thus, the rotation of the arrow B1 direction of the second leg member 22 is prevented, the maximum value of the angle θa formed between the first leg member 21 (reference line L1) and the second leg member 22 (reference line L2) is limited to a predetermined maximum rotation angle θa1.

In FIG. 3B, although not shown in detail, the same stopper 4 as the stopper 3 of the shaft portion 24 is provided at the shaft portion 23 of the base end side of the first leg member 21. Thus, the rotation angle of the first leg member 21 with respect to the bracket 102 (FIG. 2), i.e. the minimum value of the angle θb of the first leg member 21 with respect to the horizontal line is limited to the minimum rotation angle θb1. Therefore, the rotation of the first leg member 21 in the direction of arrow B2 from the state of FIG. 3B is prevented. In the present embodiment, the first leg member 21 is rotatably provided at the bracket 102 via the shaft portion 23, and the second leg member 22 is rotatably provided at the first leg member 21 via the shaft portion 24. Hereinafter, the shaft portions 23 and 24 and portions around the shaft portions 23 and 24 may be referred to as the movable portions P1 and P2. The shaft portions 23 and 24 are included in the movable portions P1 and P2.

As shown in FIG. 2, the stretchable biasing member 6 is disposed between the plate portion 102b of the bracket 102 and the second leg member 22. More specifically, one end portion of the biasing member 6 is rotatably supported at the plate portion 102b via a shaft portion 61 extending along the axial line CL5 in the left-right direction. The other end of the biasing member 6 is rotatably supported at the second leg member 22 via a shaft portion 62 extending along the axial line CL6 in the left-right direction provided in the vicinity of the shaft portion 24. The biasing member 6 is configured, for example, by an air spring which constantly exerts a biasing force in the extending direction against the compressive force.

FIGS. 4A to 4D are side views showing examples of posture changes of the table for seat 100 when the table for seat 100 moves from the accommodation position to the use position. Positions of the table for seat 100 of FIGS. 4A to 4D, for convenience, are referred to as a first position, a second position, a third position and a fourth position, respectively. The first position corresponds to the accommodation position (FIG. 1A). The fourth position is the position immediately before the top plate 1 reaches the use position (FIG. 1B).

Figure 4A:
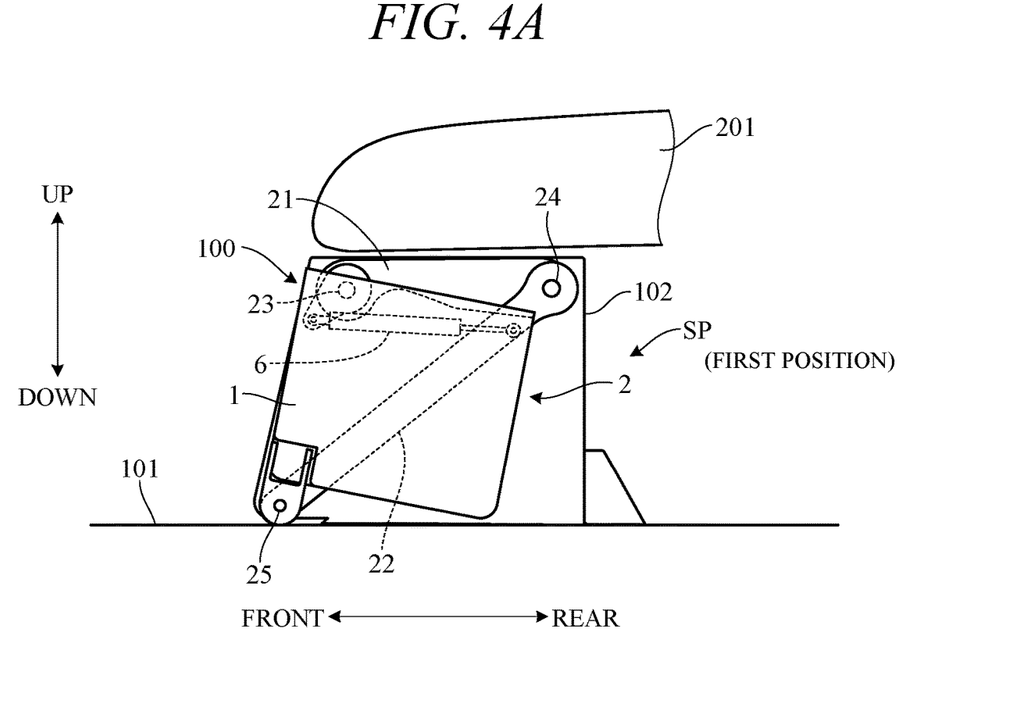
FIG. 4A is a side view showing a first position of the table for seat as an initial state when the table for seat according to the embodiment of the invention moves from an accommodation position to a use position.

The table for seat 100 is moved from the accommodation position (FIG. 1A) to the use position (FIG. 1B) in the following manner. As shown in FIG. 4A, in the initial state in which the table for seat 100 is retracted, the second leg member 22 is biased rearward by the biasing member 6, and the end portion of the second leg member 22 (shaft portion 25) is pressed against the upper surface of the floor 101. Therefore, the base portion of the top plate 1, i.e. the end portion of the second leg member 22 (shaft portion 25) is located at the lowermost portion.

In this state, the entire portion of the table for seat 100 including the top plate 1 and the leg member 2 is disposed in the accommodation space SP below the seat cushion 201. Thus, the top plate 1 of substantially rectangular shape can be accommodated efficiently in the accommodation space SP of substantially rectangular shape in the side view. That is, without narrowing the space at the foot of an occupant, it is possible to efficiently place the table for seat 100 below the seat cushion 201 where pulling out the top plate 1 is easy for the occupant.

Figure 4B:
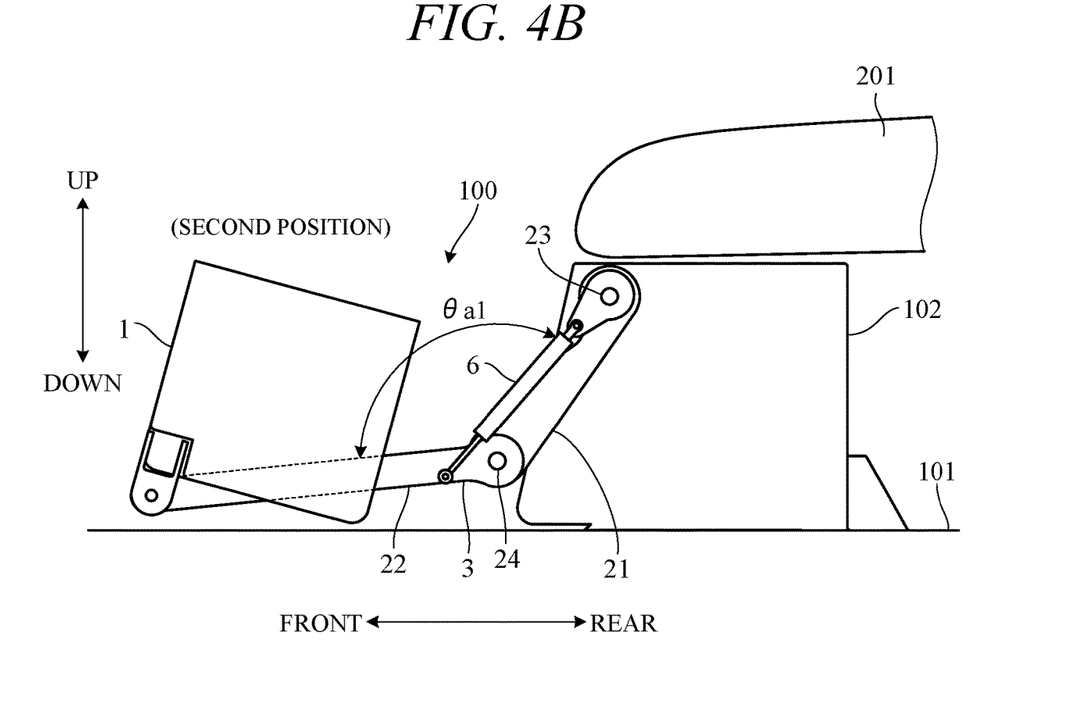
FIG. 4B is a side view showing a second position of the table for seat following FIG. 4A.

Next, the occupant grasps, for example, the upper end corner portion of the top plate 1 and pulls out the top plate 1 forward. At this time, the first leg member 21 is rotated forward through the shaft portion 23, and the second leg member 22 is biased forward by the biasing member 6. Therefore, as shown in FIG. 4B, the table for seat 100 is in the second position in which the top plate 1 is pulled out forward than the seat cushion 201. In the second position, the rotation of the second leg member 22 with respect to the first leg member 21 via the shaft portion 24 is limited by the stopper 3, and the angle θa formed by the first leg member 21 and the second leg member 22 becomes the maximum rotation angle θa1.

Figure 4C:
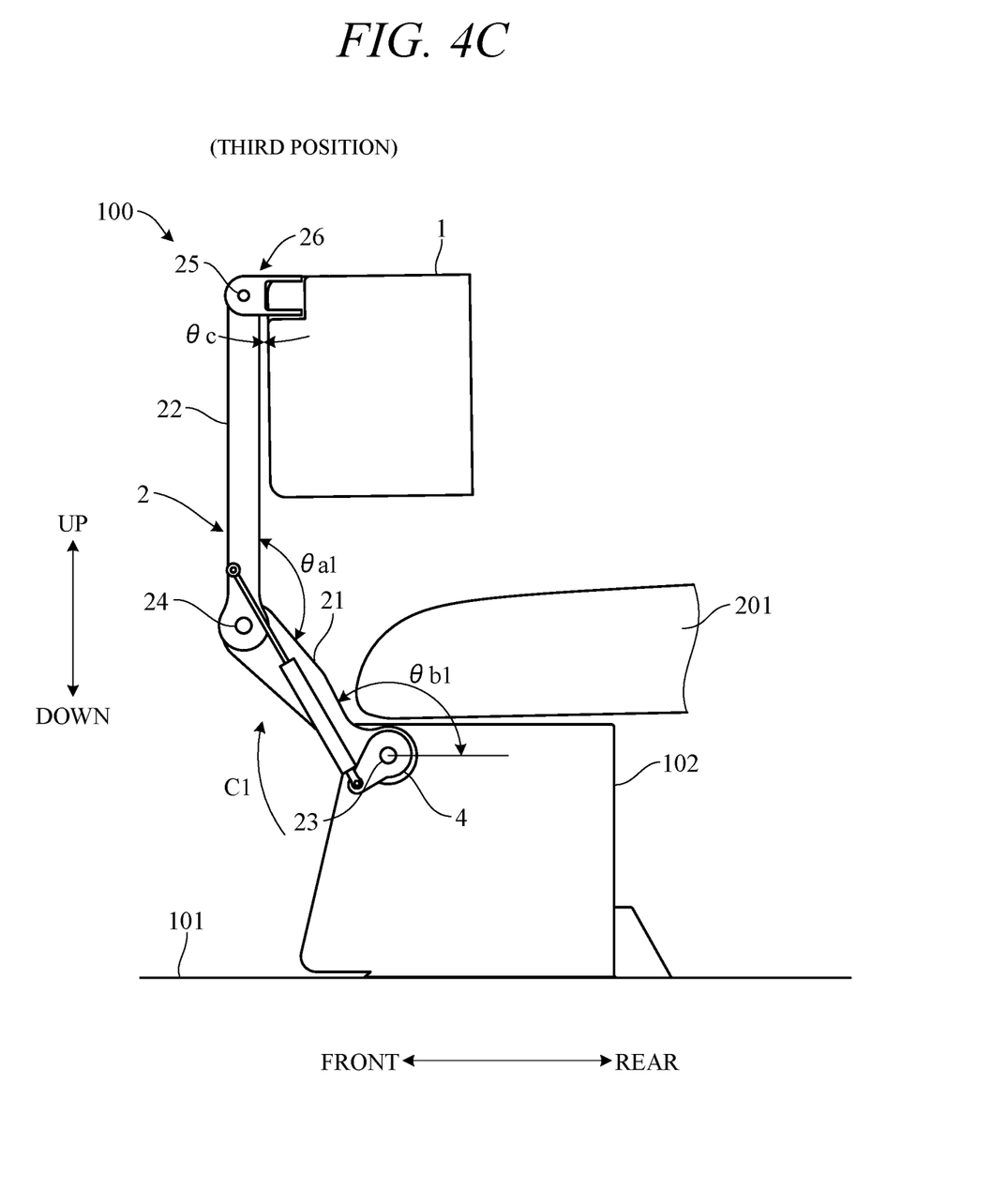
FIG. 4C is a side view showing a third position of the table for seat following FIG. 4B.

Next, the occupant grasps the top plate 1 and pulls it upward. Thus, as shown in FIG. 4C, while the angle formed between the first leg member 21 and the second leg member 22 is the maximum rotation angle θa1, the table for seat 100 is in a third position in which the leg member 2 is erected. In the third position, the top plate 1 is positioned above the upper surface of the seat cushion 201, the rotation of the first leg member 21 in the arrow C1 direction via the shaft portion 23 is limited by the stopper 4, and the angle θb of the first leg member 21 with respect to the horizontal line becomes the minimum rotation angle θb1.

Next, the occupant pulls the top plate 1 further upward. Thus, as shown by the arrow C2 in FIG. 4D, the top plate 1 is rotated upward via the shaft portion 25. In the third position, since the top plate 1 is positioned above the seat cushion 201, the top plate 1 does not interfere with the seat cushion 201 during the rotation from the third position to the fourth position. Then, the occupant rotates the top plate 1 in the right direction via the support portion 11, and sets the table 100 to the use position with the top plate 1 as a horizontal posture.

Figure 4D:
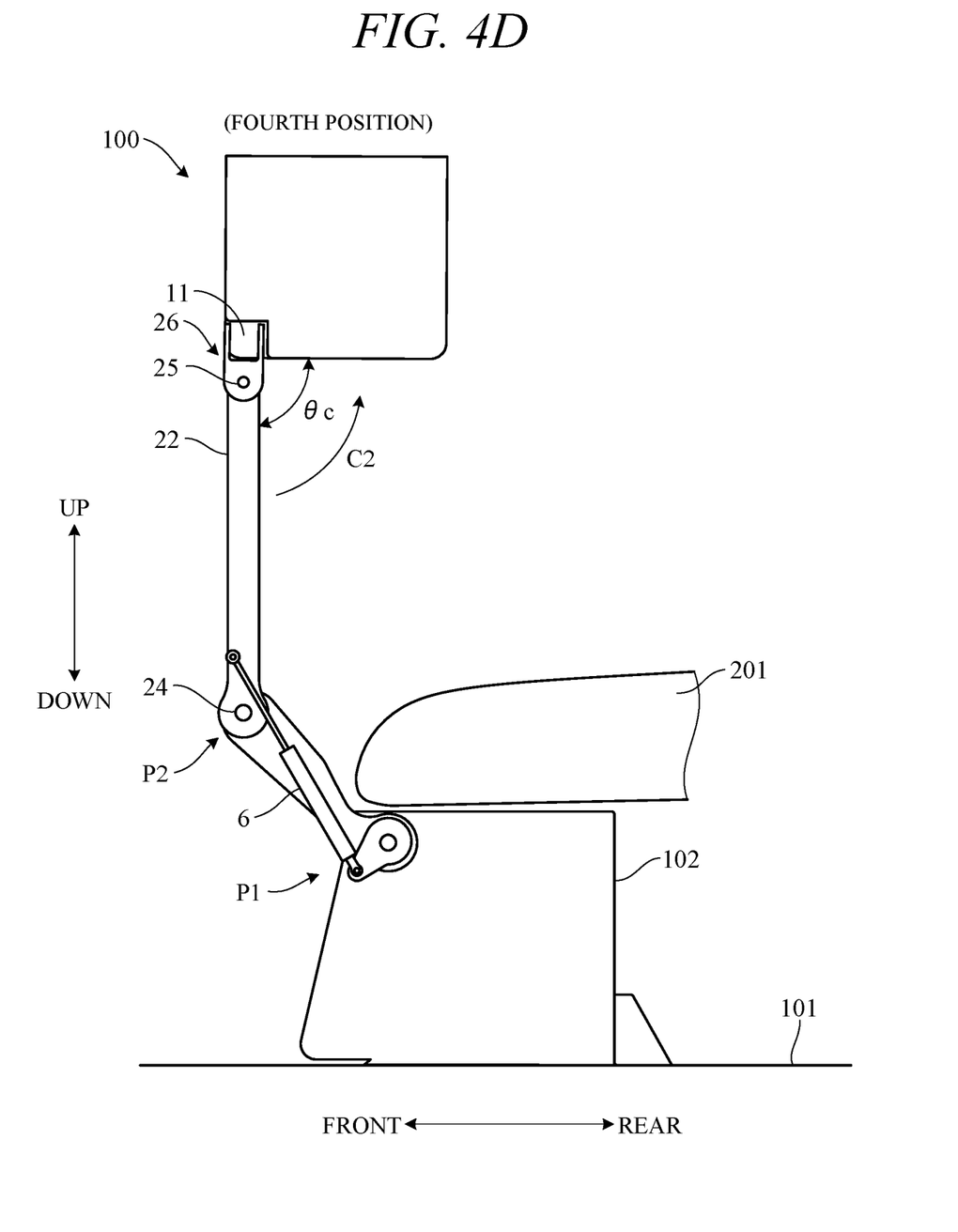
FIG. 4D is a side view showing a fourth position of the table for seat following FIG. 4C.

In the third position of FIG. 4C, the rotation angle θc of the top plate 1 with respect to the second leg member 22, i.e. the angle θc formed between the second leg member 22 and the top plate 1 is 0° (a first angle), and in the fourth position of FIG. 4D, it is 90° (a second angle). The position of the top plate 1 in FIG. 4C and the position of the top plate 1 in FIG. 4D are sometimes referred to as a first top plate position and a second top plate position, respectively. A rotation holding portion 26 for holding the rotation angle θc of the top plate 1 with respect to the second leg member 22 at a predetermined angle (0° or 90°) is provided at the shaft portion 25.

Figure 5:
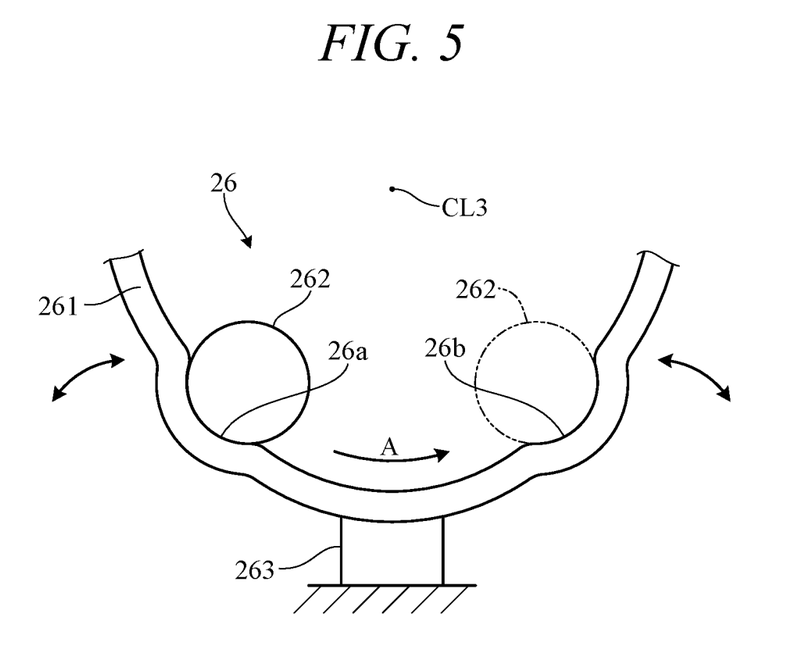
FIG. 5 is a diagram schematically showing a main configuration of a rotation holding portion for holding a rotation angle of a top plate relative to a second leg member of the table for seat according to the embodiment of the invention to a predetermined angle.

FIG. 5 is a diagram schematically showing an example of the rotation holding portion 26. As shown in FIG. 5, the rotation holding portion 26 includes a leaf spring 261 having recesses 26a and 26b corresponding to predetermined rotation angles (0° and 90°), and a pin 262 that engages with the recesses 26a or 26b.

Figure 6A:
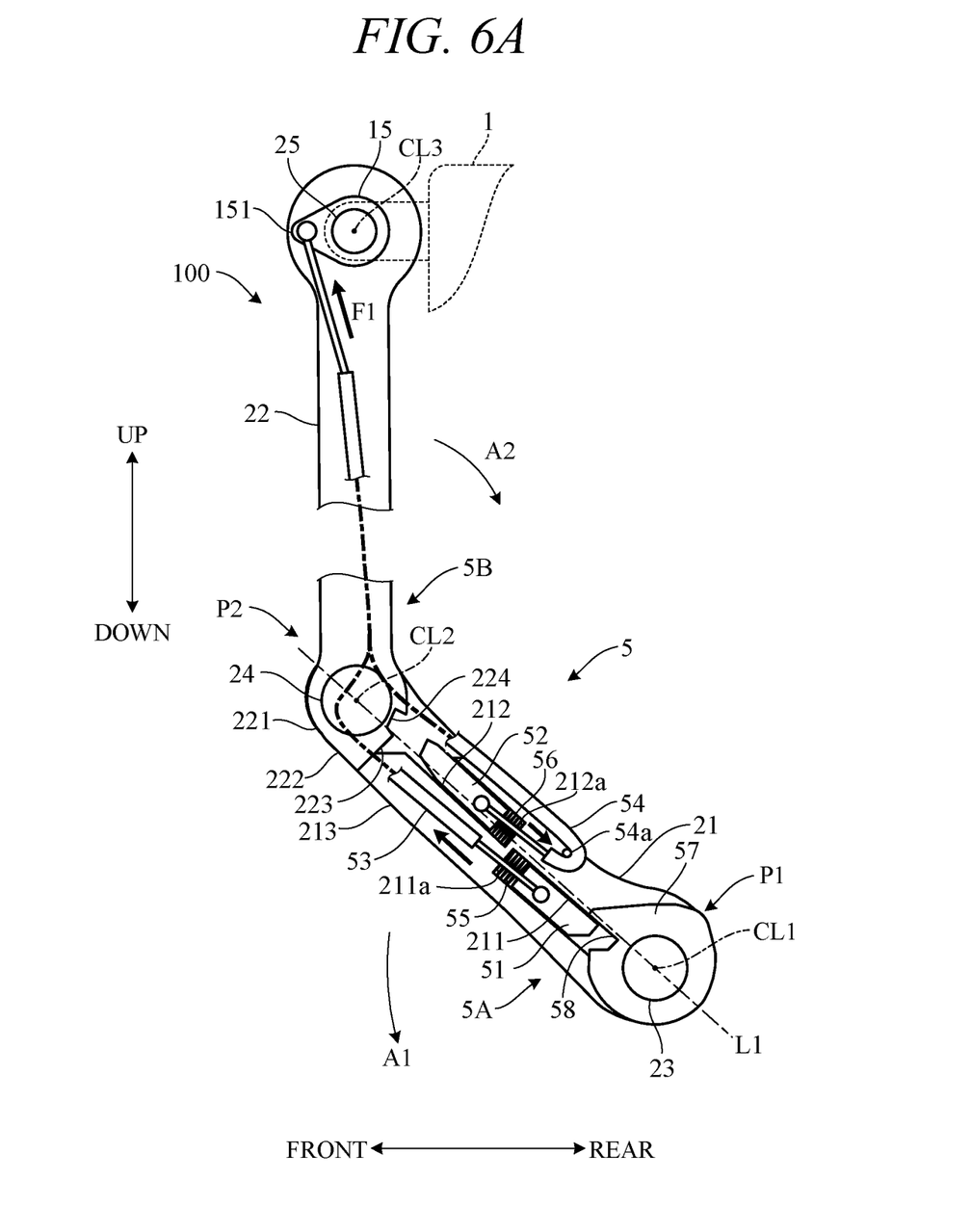
FIG. 6A is a side view showing a released state of a fixing device as an example of operation of the table for seat according to the embodiment of the invention.

The leaf spring 261 is attached to the second leg member 22 via, for example, a support portion 263, and the pin 262 is provided integrally with the top plate 1 (e.g., a brackets 151 in FIG. 6A).

The leaf spring 261 is swingable in the arrow direction about the support portion 263 as a fulcrum. When the pin 262 is engaged with the recess 26a (solid line), the rotation angle θc of the top plate 1 with respect to the second leg member 22 is held at 0°. On the other hand, as shown by arrow A, when the pin 262 moves relatively with respect to the leaf spring 261 and the pin 262 is engaged with the recess 26b (two-dot chain line), the rotation angle θc is held at 90°. The pin 262 is relatively movable beyond the recesses 26a and 26b of the leaf spring 261, thereby the rotation angle θc can become an angle, for example, smaller than 0° (see FIG. 4A). Although the rotation angle is set to 90° in this example, the rotation angle may be appropriately set according to the angle of the leg member 2.

Figure 6B:
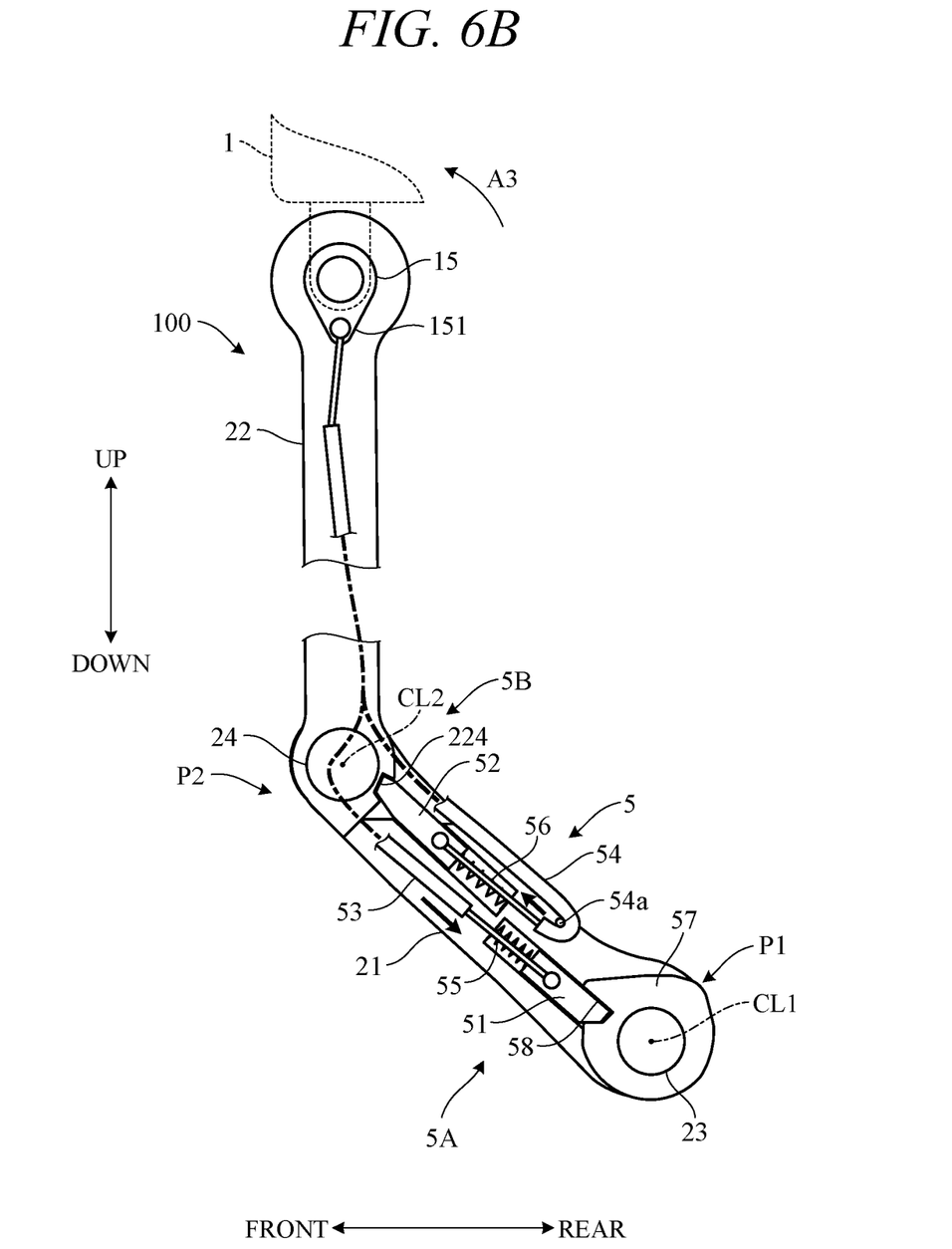
FIG. 6B is a side view showing an operating state of the fixing device as an example of operation of the table for seat according to the embodiment of the invention.

As a characteristic configuration of the present embodiment, the table for seat 100 includes a fixing device for fixing the movable portions P1 and P2 in conjunction with the rotation operation of the top plate 1 from the third position to the fourth position to fix the leg member 2 in a vertical posture. FIGS. 6A and 6B are side views of the inside of the leg member 2 showing a schematic configuration of the fixing device 50. FIG. 6A corresponds to the third position and FIG. 6B corresponds to the fourth position. The fixing device 50 includes a first fixing device 5A for fixing the movement of the movable portion P1 and a second fixing device 5B for fixing the movement of the movable portion P2.

As shown in FIGS. 6A and 6B, the first fixing device 5A includes a movable rod 51 which is movably fitted into the recess 211 of the first leg member 21 and a cable 53 which is connected to the movable rod 51. A portion of the cable 53 is shown in simplified by a chain line. The second fixing device 5B includes a movable rod 52 which is movably fitted into the recess 212 of the first leg member 21 and a cable 54 which is connected to the movable rod 52. A portion of the cable 54 is shown in simplified by a chain line. The recesses 211 and 212 are respectively extended parallel to the reference line L1 connecting the axial line CL1 and the axial line CL2, and the movable rods 51 and 52 are movable parallel to the reference line L1 along the recesses 211 and 212. More specifically, the recess 211 is formed from the end of the shaft portion 23 side of the first leg member 21 to substantially central portion in the longitudinal direction of the first leg member 21, and the recess 212 is formed from the end of the shaft portion 24 side of the first leg member 21 to substantially central portion in the longitudinal direction of the first leg member 21.

The shaft portion 25 of the distal end portion side of the second leg member 22 is provided so as to be relatively rotatable with respect to the second leg member 22. The shaft portion 15 which is a base end portion of the top plate 1 is provided at the shaft portion 25, rotatably integrally with the top plate 1. At the shaft portion 15, a bracket 151 is projected in the opposite direction of the top plate 1 from the outer peripheral surface of the opposite side of the top plate 1 across the axial line CL3. The bracket 151 rotates about the axial line CL3 along with the rotation of the top plate 1, and protrudes forward in the third position in FIG. 6A and downward in the fourth position in FIG. 6B.

The cables 53 and 54 are routed along the surfaces of the first leg member 21 and the second leg member 22 via the periphery of the shaft portion 24, and one end thereof are connected respectively to the distal end of the bracket 151. For example, the cables 53 and 54 are bundled integrally in the middle and connected to the bracket 151. The cables 53 and 54 are arranged so as not to project outward in the front-rear direction of the first leg member 21 and the second leg member 22 in a side view.

The cable 53 extends beyond the end surface 211a on the shaft portion 24 side of the recess 211, that is, the boundary surface with the convex portion 213, and the other end thereof is connected to the movable rod 51. A spring 55 (e.g., a coil spring) is interposed between the end surface 211a of the recess 211 and the movable rod 51, and the movable rod 51 is constantly biased toward the shaft portion 23 by the spring 55. A plate 57 is fixed around the shaft portion 23. The plate 57 is fixed to, for example, the bracket 102, and is not rotatable. A notch 58 is provided at the plate 57 so as to be continuous with the recess 211 when the leg member 2 is a vertical posture (third position, fourth position).
A tip portion of the movable rod 51 is engageable with the notch 58, and when the movable rod 51 is engaged with the notch 58, the rotation of the first leg member 21 about the axial line CL1 is prevented. That is, the movable portion P1 is fixed by operation of the first fixing device 5A.

The cable 54 changes direction by 180° via a pin 54a protruding in the left-right direction from the first leg member 21, and then extends beyond the end surface 212a of the recess 212 on the shaft portion 23 side (boundary surface with the convex portion 213), and the other end portion thereof is connected to the movable rod 52. A spring 56 (e.g., a coil spring) is interposed between the end surface 212a of the recess 212 and the movable rod 52, and the movable rod 52 is constantly biased toward the shaft portion 24 by the spring 56. A notch 224 is formed on the outer peripheral surface of the end portion of the second leg member 22 (bearing portion 221), i.e., on the end face 223 of the right angle portion 222, so as to be continuous with the recess 212 when the leg member 2 is in the vertical posture (third position, fourth position). The distal end portion of the movable rod 52 is engageable with the notch 224, and when the movable rod 52 is engaged with the notch 224, the rotation of the second leg member 22 about the axial line CL2 is prevented. That is, the movable portion P2 is fixed by operation of the second fixing device 5B.

The operation of the fixing device 5 in FIG. 6A and FIG. 6B will be described. As shown in FIG. 6A, when the table for seat 100 is positioned at the third position, the rotation angle θc of the top plate 1 with respect to the second leg member 22 is 0° (see FIG. 4C). At this time, the bracket 151 of the shaft portion 15 of the top plate 1 protrudes rearward, tensile force F1 acts on the movable rods 51 and 52 through the cables 53 and 54, respectively. Thus, as shown by the arrow in FIG. 6A, the movable rod 51 is moved to the shaft portion 24 side against the biasing force of the spring 55, and the movable rod 52 is moved to the shaft portion 23 side against the biasing force of the spring 56.

Therefore, the distal end portions of the movable rods 51 and 52 are detached from the notches 58 and 224, respectively, thus the fixing of the movable portions P1 and P2 by the fixing device 5 is released. Therefore, the rotation of the first leg member 21 about the axial line CL1 and the rotation of the second leg member 22 around the axial line CL2 are enabled. In the third position, since the rotation of the first leg member 21 is limited by the stopper 4 (FIG. 3B), the first leg member 21 can be rotated only forward (arrow A1 direction). Further, since the rotation of the second leg member 22 with respect to the first leg member 21 is limited by the stopper 3 (FIG. 3B), the second leg member 22 can be rotated only rearward (arrow A2 direction).

As shown in FIG. 6B, in order to use the table 100, when the occupant operates to rotate the top plate 1 in the arrow A3 direction from the state of FIG. 6A, the rotation angle θc of the top plate 1 with respect to the second leg member 22 is 90° (see FIG. 4D). At this time, the bracket 151 of the shaft portion 15 of the top plate 1 protrudes downward, and the cables 53 and 54 are loosened. Thus, as shown by the arrow in FIG. 6B, the movable rod 51 moves to the shaft portion 23 side by the biasing force of the spring 55, and the movable rod 52 is moved to the shaft portion 24 side by the biasing force of the spring 56.

As a result, the distal end portion of the movable rod 51 is engaged with the notch 58 of the plate 57, thus the rotation of the first leg member 21 about the axial line CL1 is prevented. Further, the distal end portion of the movable rod 52 is engaged with the notch 224 of the end of the second leg member 22, thus the rotation of the second leg member 22 about the axial line CL2 is prevented. That is, the movements of the movable portions P1 and P2 by operation of the fixing device 5 are fixed, and the leg member 2 is held in the vertical posture.

Thus in this embodiment, the fixing device 5 operates in conjunction with the rotation operation upward of the top plate 1 when the seat table 100 is moved from the accommodation position (FIG. 1A) to the use position (FIG. 1B), and the leg member 2 is fixed in the vertical posture. Therefore, the table for seat 100 can be easily held in the use position. That is, since the top plate 1 is movably provided from the accommodating position to the use position via the rotatable leg member 2, it is necessary to fix the movement of the leg member 2 in order to use the table for seat 100 in a stable posture. If this fixing is performed separately from the operation of moving the table for seat 100, a complicated operation is required for the occupant, and it is difficult to quickly change the posture of the table for seat 100 to the use position. In this regard, in the present embodiment, since the fixing device 5 is operated in conjunction with the operation of the movement of the table for seat 100, it is possible to easily realize a quick posture change to the use position of the table for seat 100.

According to the present embodiment, following functions and effects can be exerted.

According to the present embodiment, following functions and effects can be exerted.

(1) A table for seat 100 is provided facing the seat 200 installed above the floor 101 of the vehicle (FIG. 1A, FIG. 1B). The table for seat 100 includes a top plate 1, and a leg member 2 attached to the bracket 102 provided below the seat 200 (seat cushion 201) for movably supporting the top plate 1 from an accommodation position below the seat cushion 201 for supporting the hip of the occupant to a use position above the seat cushion 201 (FIG. 2). The leg member 2 includes movable portions P1 and P2, and a fixing device 5 for fixing the movement of the movable portions P1 and P2 in conjunction with the operation of the top plate 1 (FIG. 6A and FIG. 6B).

Thus, since the table for seat 100 in the present embodiment is accommodated below the seat cushion 201 when not in use, it is possible to easily provide the table for seat 100 having a sufficient size without miniaturizing the seat 200 in the width direction, and constraint in the installation space of the seat 200 can be prevented from being increased. Further, since the movement of the movable portions P1 and P2 in conjunction with the operation of the top plate 1 is fixed, it is possible to easily set the table for seat 100 in the use position.

(2) The fixing device 5 fixes the movement of the movable portions P1 and P2 in conjunction with the rotation operation of the top plate 1 which is rotatably provided via the shaft portion 25 (FIG. 6A, FIG. 6B). Thus, it is possible to easily fix the movable portions P1 and P2 in a simple operation.

(3) The leg member 2 includes a plurality of movable portions P1 and P2 corresponding to the shaft portions 23 and 24 (FIG. 3B). The fixing device 5 includes a first fixing device 5A provided corresponding to the movable portion P1 so as to fix the movement of the movable portion P1, and a second fixing device 5B provided corresponding to the movable portion P2 so as to fix the movement of the movable portion P2 (FIG. 6A, FIG. 6B). Thus, it is possible to operate a plurality of fixing devices 5A and 5B at the same time by a single rotation operation of the top plate 1, and it is possible to easily fix the leg member 2.

(4) The leg member 2 is configured so that the posture of the leg member 2 is changeable from the retracted posture corresponding to the accommodation position of the top plate 1 to the vertical posture corresponding to the use position (FIGS. 2A to 2D). The fixing device 5 fixes the movement of the movable portions P1 and P2 in conjunction with the rotation operation of the top plate 1 when the leg member 2 is in the vertical posture (FIG. 6A, FIG. 6B). Thus, the leg member 2 can be easily fixed in the vertical posture by the operation of the top plate 1.

(5) The fixing device 5 includes movable rods 51 and 52 for stopping the movement of the movable portions P1 and P2 by engaging with the movable portions P1 and P2 (notches 58 and 224), and cables 53 and 54 connected to the top plate 1 and the movable rods 51 and 52 to transmit the driving force (tensile force F 1) by the operation of the top plate 1 to the movable rods 51 and 52 (FIG. 6A, FIG. 6B). Thus, it is possible to easily configure the fixing device 5, and it is possible to firmly fix the movement of the movable portions P1 and P2 by the engagement between the movable rods 51 and 52 and the notches 58 and 224.

Various modifications of the above embodiment are possible. Some examples are explained in the following. Although in the above embodiment, the leg member 2 having the first leg member 21 and the second leg member 22, i.e., the leg member 2 (a leg part) having the pair of leg members 21 and 22 is configured as a leg part for movably supporting the top plate 1. However, the configuration of the leg part is not limited to this. For example, instead of a pair of rotatable leg members, the leg part may be formed by leg members more than two leg members, or by a single leg member. Although in the above embodiment, the pair of fixing devices 5A and 5B are operated simultaneously, they may be operated separately. Instead of two fixing devices, one fixing device or three or more fixing devices may be provided. Movable portions of the leg part are not two, but may be three or more, or one.

Although in the above embodiment, the top plate 1 is moved from the accommodation position below the seat cushion 201 (a sitting portion of the seat) to the use position above the seat cushion 201 by the rotation of the leg member 2, the top plate may be moved to the use position by a movement of the leg part including linear movement in a predetermined direction not only the rotational movement. Although in the above embodiment, the fixing device 5 is operated in conjunction with the rotation operation of the top plate 1, a fixing device may be operated in conjunction with the operation in a linear direction.

In the above embodiment, the fixing device 5 includes the movable rods 51 and 52 (an engagement portion) for stopping the movement of the movable portions P1 and P2 by engaging with the movable portions P1 and P2, and the cables 53 and 54 (a transmission portion) for transmitting the driving force by the operation of the top plate 1 to the movable rods 51 and 52. However, as long as fixing the movement of the movable portion in conjunction with the operation of the top plate, the configuration of a fixing device may be any configuration. Although in the above embodiment, the posture of the leg member 2 can be changed from the retracted posture (a first posture) corresponding to the accommodation position of the top plate 1 to the vertical posture (a second posture) corresponding to the use position, the first posture and the second posture may be other posture than those described above.

Although in the above embodiment, the air spring is used as the biasing member 6, another elastic member such as a coil spring may be used as a biasing member. In the above embodiment, the leg member 2 of the table for seat 100 is supported at the bracket 102 projecting upward from the upper surface of the floor 101, but the configuration of a support portion is not limited thereto. For example, a support portion may be provided in a frame of the seat 200.

In the above embodiment, the table for seat 100 is placed at the central portion in the left-right direction of the seat 200 of the vehicle continuous to the left and right, and the table for seat 100 is developed outward in the left-right direction when the table is used, provided independently the left and right sheets. However, left and right seats may be provided separately and a table for seat 100 may be provided for each seat.

In the above embodiment, the table for seat 100 is applied to the seat 200 of the rear of the vehicle, but it can also be applied to the front seat. The table for seat can be similarly applied to ones other than vehicles. Therefore, the configuration of the sitting portion for supporting the hip of the occupant is not limited to that described above.

The above embodiment can be combined as desired with one or more of the above modifications. The modifications can also be combined with one another.

According to the present invention, it is possible to provide a table for seat without increasing a restriction of an installation space of a seat.

Above, while the present invention has been described with reference to the preferred embodiments thereof, it will be understood, by those skilled in the art, that various changes and modifications may be made thereto without departing from the scope of the appended claims.

What is claimed is:

1. A vehicle comprising:
a seat installed above a floor of the vehicle, and including:
a sitting portion;
a support portion provided below the sitting portion; and
a table provided facing the seat, wherein
the table includes:
a top plate; and
a leg part attached to the support portion to movably support the top plate from an accommodation position below the sitting portion to a use position above the sitting portion, wherein
the leg part includes
a movable portion, and
a fixing device configured to fix a movement of the movable portion in conjunction with an operation of the top plate,
a posture of the leg part is changeable from a first posture corresponding to the accommodation position of the top plate to a second posture corresponding to the use position of the top plate,
the leg part in the first posture is retracted in a space below the sitting portion, while in the second posture is erected in front of a front end of the sitting portion, and
the fixing device is configured to fix the movement of the movable portion in conjunction with the operation of the top plate when the leg part is in the second posture.

2. The vehicle according to claim 1, wherein
the fixing device is configured to fix the movement of the movable portion in conjunction with a rotation operation of the top plate.

3. The vehicle according to claim 1, wherein
the leg part includes a plurality of the movable portions, and
the fixing device is arranged so as to fix movements of the plurality of the movable portions at once.

4. The vehicle according to claim 1, wherein
the fixing device includes
an engagement portion engaged with the movable portion to stop the movement of the movable portion, and
a transmission portion connected to the top plate and the engagement portion to transmit a driving force by the operation of the top plate to the engagement portion.

5. The vehicle according to claim 4, wherein
the top plate is rotatably supported at a distal end of the leg part so as to rotate between a first position where an angle relative to the leg part is a first angle and a second position where the angle relative to the leg part is a second angle greater than the first angle, and
the engagement portion is engaged with the movable portion when the top plate is operated to rotate from the first position to the second position to be moved to the use position.

6. The vehicle according to claim 5, wherein
the movable portion includes a shaft portion supporting rotatably the leg part about an axial line extending in a width direction of the seat,
the leg part includes a recess formed on a surface of the leg part perpendicular to the axial line along a longitudinal direction of the leg part, and
the engagement portion is movably accommodated in the recess.

7. The vehicle according to claim 6, wherein
the shaft portion includes a notch on an outer peripheral surface of the shaft portion, and
the engagement portion is movably accommodated in the recess so as to engage with the notch.

8. The vehicle according to claim 5, wherein
the top plate is provided rotatably from the first position to the second position in a vertical direction.

* * * * *